United States Patent
Hayati et al.

(12)

(10) Patent No.: US 6,273,928 B1
(45) Date of Patent: Aug. 14, 2001

(54) POURABLE AQUEOUS BORON-CONTAINING COMPOSITIONS AND THEIR PREPARATION

(75) Inventors: Igan Hayati, Slough; Colin William Campbell, Wallington, both of (GB)

(73) Assignee: U.S. Borax Inc., Valencia, CA (US)

( * ) Notice: Subject to any disclaimer, the term of this patent is extended or adjusted under 35 U.S.C. 154(b) by 0 days.

(21) Appl. No.: 09/419,323

(22) Filed: Oct. 15, 1999

(30) Foreign Application Priority Data

Oct. 19, 1998 (GB) .................................................. 9822797

(51) Int. Cl.⁷ ............................. C01B 33/26; C01B 35/12
(52) U.S. Cl. ...................... 71/27; 71/31; 71/61; 423/277; 423/279; 516/79
(58) Field of Search .................................. 71/27, 31, 61, 71/64.08, 64.1; 106/18.3; 423/277, 279; 516/77, 79

(56) References Cited

U.S. PATENT DOCUMENTS

| | | |
|---|---|---|
| 2,994,615 | 8/1961 | McDonald . |
| 3,326,733 | 6/1967 | Calgrove . |
| 4,214,912 | 7/1980 | Racciato et al. . |
| 4,332,609 | 6/1982 | Ott . |
| 4,572,733 * | 2/1986 | Howard ............................... 71/64.08 |
| 4,609,475 | 9/1986 | Hanlon et al. . |
| 4,778,833 | 10/1988 | Van der Drift et al. . |
| 4,801,404 * | 1/1989 | Dietrich et al. ...................... 252/607 |
| 5,102,571 | 4/1992 | Mole et al. . |
| 5,129,946 * | 7/1992 | Evans ................................... 106/18.3 |
| 5,306,478 * | 4/1994 | Hayati et al. ......................... 423/279 |
| 5,342,438 * | 8/1994 | West ..................................... 106/18.3 |
| 5,525,147 * | 6/1996 | Dunstan et al. ..................... 106/18.3 |
| 5,658,867 | 8/1997 | Pancheri et al. . |

FOREIGN PATENT DOCUMENTS

| | | |
|---|---|---|
| 33827/84 B | 4/1985 | (AU) . |
| 62325/86 A | 3/1993 | (AU) . |
| 0289317 B1 | 11/1988 | (EP) . |
| 0 550 280 A1 | 7/1993 | (EP) . |
| 1297743 | 11/1972 | (GB) . |
| 1395502 | 5/1975 | (GB) . |
| 2178055 A * | 2/1987 | (GB) . |
| S61-158907 A | 7/1986 | (JP) . |
| WO 99/13022 A1 | 3/1999 | (WO) . |
| WO 99/20565 A1 | 4/1999 | (WO) . |

* cited by examiner

*Primary Examiner*—Wayne Langel
(74) *Attorney, Agent, or Firm*—Kurt R. Ganderup

(57) ABSTRACT

A pourble aqueous borate-containing suspension which suspension in water contains 8 to 13% by weight boron as sodium pentaborate, 0.1 to 3% by weight of a swellable clay, and 0.05 to 0.2% by weight of a polysaccharide. The aqueous compositions according to the invention are physically stable, yet pourable and therefore readily handled. They may be used directly or, if appropriate, diluted for use. They may be used as a source of boron for crops or for other applications where there is a need for aqueous soluble borate suspensions.

27 Claims, No Drawings

POURABLE AQUEOUS BORON-CONTAINING COMPOSITIONS AND THEIR PREPARATION

This invention relates to pourable aqueous boron-containing compositions, particularly pourable aqueous borate-containing compositions having a high boron content, and to their preparation.

BACKGROUND OF THE INVENTION

It is known to prepare borate solutions with a high boron content using organic solvents. Thus U.S. Pat. No. 4,332,609 describes a method of fertilising plants in which the reaction product of a boric acid compound with an alkanolamine or aliphatic polyamine, in particular monoethanolamine, is applied to plants. The reaction products are water-soluble and thus can be dissolved in water for application to crops. The production of the monoethanolamine reaction products for example, adds to the cost of the boron to be applied to the crops.

Using an alternative organic solvent, U.S. Pat. No. 4,572,733 describes a so-called storage-stable concentrate formed by making a solution of a first boron compound in a water-miscible glycol solvent and then dispersing fine particles of a second boron compound in the solution. For use, the storage-stable concentrate is diluted with water and applied to crops.

Aqueous borate suspension formulations have been proposed for the treatment of timber. Thus AU-A-574389 proposes the use of a preservative composition comprising a colloidal micro-crystalline suspension of boron salts and a thickening agent, which serves to maintain the stability of the suspension. Similarly EP-A-0289317 describes timber preservative compositions comprising a boron-containing preservative, which may be a micro-crystalline suspension, e.g. 10 to 30 microns, and a thickening agent such as the polysaccharide xanthan gum in a preferred amount of 0.25 to 3.0% by weight. These compositions are obtained by forming, with heating, a borate solution, cooling rapidly to obtain crystals and adding thickening agent to maintain the crystals in suspension. Such compositions are stiff and pasty.

The combination of borates and xanthan gum has also been described in connection with other applications. For example, UK Patent No. 1,395,502 discloses herbicidal compositions containing gelling agent compounds such as a combination of xanthan gum and a borate salt. U.S. Pat. No. 3,326,733 discloses a gelled explosive containing water, Xanthamonous hydrophilic colloid, borax and a monovalent water-soluble explosive salt. Japanese Patent Application No. S61-158907 describes compositions for a mold and mildew removing agent that contains an organic polymer, such as xanthan gum, guar gum, locust bean gum, casein or other similar materials, in combination with a peroxide compound, such as hydrogen peroxide or a hydrogen peroxide producing compound such as sodium perborate monohydrate or sodium perborate tetrahydrate.

SUMMARY OF THE INVENTION

According to this invention, there are provided highly stable yet readily pourable aqueous borate-containing formulations having a high boron content. They can be prepared using an anti-settling system comprising a swellable clay and a polysaccharide. The compositions of this invention comprise a pourable aqueous borate-containing suspension which suspension in water contains 8 to 13% by weight boron as sodium pentaborate, 0.1 to 3% by weight, based on the total weight of the composition, of a swellable clay, and 0.05 to 0.2% by weight, based on the total weight of the composition, of a polysaccharide.

DETAILED DESCRIPTION OF THE INVENTION

It has surprisingly been found that the presence of the specified amounts of clay and polysaccharide in the aqueous suspension compositions of this invention have a significant viscosity-reducing effect. This means that there may readily be obtained according to the invention aqueous borate-containing suspensions which on the one hand have a high boron content and on the other hand are pourable making them capable of being easily handleable by users. Thus the compositions according to the present invention may be sprayed directly or, alternatively poured for dilution by water or aqueous systems for application, e.g. onto crops, or for other applications where there is a need for aqueous soluble borate suspensions.

The compositions according to the invention are pourable and, at the same time, physically stable, that is the compositions have:

(a) a sufficiently high viscosity at low stresses (shear rates) e.g. under stable storage and transport conditions so as to prevent particle sedimentation or significant separation; and (b) a sufficiently rapid decrease in viscosity at a particular stress (depending on the application) e.g. under pouring, pumping or spraying conditions that ensures the pourability of the product on application.

Thus the suspensions according to the invention do not separate when stored or when subjected to minor vibration e.g. when transported. Typically under such conditions the suspensions are subjected to shear rates below 1 $sec^{-1}$, e.g. 0.001 to 0.1 $sec^{-1}$ for storage. At higher shear rates, the compositions are capable of being poured, pumped or sprayed.

The pourable aqueous borate-contaning compositions according to the present invention may contain from 8 to 13% by weight boron as sodium pentaborate, generally 9.5 to 12.5% by weight boron as sodium pentaborate, preferably 10 to 12% by weight boron as sodium pentaborate.

Suitable swellable clays which may be used in the suspensions according to the present invention include the montmorillonite group of clays, particularly sodium enriched montmorillonite clays and sodium montmorillonite clays, some of which are known commercially as bentonite, minerals analogous to montmorillonite such as hectorite, and sepiolite.

The amount of swellable clay employed in the suspensions according to the present invention is 0.1 to 3% by weight, preferably 0.5 to 1.5% (e.g. approximately 1%) by weight, based on the total weight of the composition. Generally the composition would contain between 1 and 1.5% by weight of montmorillonite clays such as IGB clay minerals available from IMV Nevada. When other clays are used, such as sodium enriched bentonite, e.g. Bentonite MB 300S from Fordamin Company Limited, the amount of clay required may be up to 3% by weight, preferably approximately 2.5% by weight.

A particularly preferred polysaccharide in the compositions according to the invention is xanthan gum. The amount of polysaccharide, e.g. xanthan gum, used may be 0.05 to about 0.2%, preferably 0.05 to 0.16%, more preferably 0.08 to 0.15% or 0.08 to 0.14%, most preferably about 0.1% or 0.12%, based on the total weight of the composition.

Optionally a dispersant, for example an acrylic polymer, or water soluble polymeric dispersants such as polyethylene oxide, hydrolysed polyvinal acetates, polyvinyl pyrrolidone, polyacrylamide and polyvinyl alcohol, may be added prior to the polysaccharide during the manufacture of the suspension according to the invention. This aids the dispersion of the polysaccharide in water. The amount of dispersat may be small. For example 0.05 to 1%, generally about 0.1% by weight, of a polyacrylate dispersant may be used.

Preferred suspensions according to the present invention contain, based on the total weight of the composition:

10 to 12% by weight boron as sodium pentaborate;

0.5 to 1.5% by weight of IGB;

0.05 to 0.16, e.g. to 0.15% by weight xanthan gum;

0.00 to 0.5% by weight polyacrylate dispersant;

the remainder being water.

The amount of the anti-settling system incorporated obviously depends on the size and concentration of the resulting suspended particles. Generally speaking the suspension comprises particles less than 10 microns in size, e.g. in the range 0.1 to 10 microns, and more preferably below 5 microns (e.g. 0.1 to 5 microns) in size.

The nature of the interaction between the sodium pentaborate and clay and polysaccharide, leading to reduced viscosity, is not fully understood. The reduced viscosity observed with the addition of ingredients which would normally be expected to result in a thickening effect is regarded as most surprising.

The suspensions according to the present invention may suitably be prepared by forming the sodium pentaborate in suspension, with agitation, in situ by reaction in water of boric acid and a hydrated sodium tetraborate, preferably sodium tetraborate pentahydrate, in the presence of the other ingredients.

According to the present invention there is provided a process for preparing a suspension, which process comprises, in aqueous suspension, allowing boric acid and a sodium tetraborate, generally in substanually stoichiometric amounts for sodium pentaborate, to react under agitation, in the presence of the clay, polysaccharide and any other ingredients.

According to one embodiment, there is provided a process for preparing a suspension according to the invention which process comprises forming a mixture of the clay, polysaccharide and any other ingredients with water, adding boric acid and a hydrated sodium tetraborate in substantially stoichiometric amounts for sodium pentaborate and allowing to react under agitation.

The particle sizes of the borate feed stocks are not critical. They may be in granular, crystalline or finely divided forms. Alternatively, they may be added as wet cakes or slurries.

In one aspect of the invention, the water can be derived from plant liquors obtained from processes well known to the art for manufacture of boric acid or sodium tetraborates, that are saturated with the respective boric acid or sodium tetraborate.

Preferably the clay is dispersed in water at about 25° C. (optionally containing a dispersant) according to the manufacturers recommendations (about 10 minutes). The polysaccharide is then added to the suspension and dissolved according to the manufacturers recommendations (about 50 minutes). This results in hydration of the clay. After this period the mixture may optionally be heated, e.g. up to about 50° C., e.g. to 35 to 40° C., suitably about 38° C. Boric acid and sodium tetraborate are then added and the mixture is allowed to react, with agitation, generally for about one half to one and a half hours, preferably about forty five minutes, i.e. until coarse particles are essentially all reacted, e.g. after 1 hour. At no time should there be complete solution of the borate ingredients and sodium borate reaction product. The mixture may then be discharged to a holding vessel or packed. Generally speaking the reaction may continue on standing with any remaining coarse particles disappearing on standing, e.g. overnight.

The reaction is endothermic leading to an initial drop in temperature. The reaction is preferably carried out at 20° C. with the endotherm leading to a cooling to about 12° C. after 5 to 10 minutes while the exotherm leads to a temperature rise to about 20° C. when the crystallisation is all but complete i.e. after about 30 minutes. A temperature of 20° C., i.e. no external heating is required, is preferred, for the purpose of dispersing the clay and polysaccharide. However, it may be desired to heat the clay and polysaccharide dispersion prior to addition of the boric acid and sodium tetraborate. If the temperature is allowed to become too high, e.g. up to 80° C., crystal sizes may become unacceptably high. However, temperatures of up to 50° C., e.g. 35 to 40° C., suitably 38° C., may generally be used with advantage and without adverse effect on particle size. The particle size of the crystals making up the suspension are predominantly in the range of 0.1 to 10 microns. When the reaction is carried out with heating, the reaction times are generally shortened.

The boric acid and sodium tetraborate react with the formation of sodium pentaborate. The reactants will normally be used in their stoichiometric ratio of $Na_2O:5B_2O_3$. Any excess boric acid or sodium tetraborate will remain unreacted and may contribute to coarser crystals in the final products. In some applications excess boric acid may be desired. In this case, when fine boric acid is required, the final suspension may be wet milled. In a modification finely divided boric acid may be added to the final suspension. Unexpectedly this results in a product having substantially the same flow properties as product without boric acid addition. This is the case for example when the amount of boric acid present increases the overall content from 10 to 11%.

The compositions according to the invention may be used as fertilisers.

When used for the application of boron to crops, the composition according to the present invention is compatible with and may be used together with other plant fertilisers for simultaneous spraying. However, with the well established nitrogen fertiliser N39 (39% by volume nitrogen), to ensure compatibility, the clay selected is suitably IGB and this is used with xanthan gum and an acrylic polymer dispersant that assists the dispersion of the ingredients of the composition in N39.

It may also be convenient in some applications to incorporate small amounts of other treatment agents such as micronutrients, herbicides, fungicides or insecticides.

According to the invention, there is provided a method of treating crops, e.g. as a fertiliser, which method comprises:

(a) diluting with water a suspension according to the invention, optionally in the presence of another treatment agent; and (b) applying the diluted composition to a crop (i.e. directly on the crop or to a location in which crops are growing or are intended to grow).

Also there is provided a method of treating crops e.g. for fertilisation which method comprises applying a suspension according to the invention optionally in the presence of another treatment agent, to a crop (i.e. directly on the crop or to a location in which crops are growing or are intended to grow).

EXAMPLES

The invention is further illustrated with reference to the following Examples:

Example 1

A pourable aqueous borate-containing suspension was prepared as follows:

Water (4698 g) at 20° C. was added to a 5 litre reaction vessel and stirred at 500 rpm. 12 g of Dispex N40 acrylic polymer dispersant (product of Allied Colloids) was added followed by 123 g IGB clay (product of IMV Nevada). Stirrng was continued for 10 minutes and then 12 g of Kelzan xanthan gum (product of Kelco Industrial Biopolymers) were added and stirring was continued for a further 50 minutes.

The mixture was transferred to a 10 litre reaction vessel and stirred at 1000 rpm using a saw-toothed stirg disc to ensure constat agitation of all of the composition. 4200 g of Optibor TG boric acid (product of U.S. Borax Inc.) was added and this was immediately followed by 3300 g of Neobor borax pentahydrate (product of U.S. Borax Inc.). Agitation was continued for a further 60 minutes.

The product was a pourable suspension containg 10% by weight boron as sodium pentaborate with the suspended particles having a particle size less than 10 microns.

Examples 2 to 6

The method of Example 1 was followed and the ingredients were added in the amounts shown in Table I below.

A pourable stable composition was obtained in each case.

TABLE I

| Example No. | BA[1] (g) | Neobor (g) | IGB (g) | Kelzan (g) | Dispex (g) | Water (g) | % B[2] in product |
|---|---|---|---|---|---|---|---|
| 2 | 4200 | 3300 | 123 (1.0%) | 12 (0.1%) | — | 4709 | 10.0 |
| 3 | 4200 | 3300 | 112 (1.0%) | 11 (0.1%) | — | 3599 | 11.0 |
| 4 | 4200 | 3300 | 112 (1.0%) | 11 (0.1%) | 11 (0.1%) | 3588 | 11.0 |
| 5 | 4200 | 3300 | 103 (1.0%) | 10 (0.1%) | — | 2674 | 12.0 |
| 6 | 4200 | 3300 | 103 (1.0%) | 10 (0.1%) | 10 (0.1%) | 2664 | 12.0 |

[1]"BA" represents Optibor TG boric acid.
[2]"% B" represents the percentage boron as sodium pentaborate.

Example 7

247 g (2% by weight) Bentonite MB 300S were dispersed in water (4585 g) at 40° C. with stirring over 10 minutes. 12 g (0.1% by weight) of Kelzan were added and the stirng was continued for a further 50 minutes. Optibor TG (4200 g) and Neobor (3300 g) were added to the mixture obtained. The resulting mixture was stirred at 850 rpm for 45 minutes using a saw toothed blade.

The product was a pourable and stable suspension containing 10% by weight boron as sodium pentaborate, with the suspended particles having a particle size less than 10 microns.

Example 8

Water (132.5 kg) at 20° C. was poured into a 200 litre tank stirred at 200 rpm using a 10 cm diameter saw toothed head. 0.35 kg (0.1% by weight) of Dispex N40 were added followed by 3.5 kg (1% by weight) IGB clay. Stirring was continued for 10 minutes and then 0.35 kg (0.1% by weight) Kelzan was added and stirring was continued for a further 50 minutes.

The mixture was transferred into a 500 litre tank provided with a heating coil and stirred using dual high efficiency hydrofoil propellers 25 cm in diameter. The mixture was then heated to 38° C. by pumping steam through the heating coil. Optibor TG (119.5 kg) and Neobor (94 kg) were added to the tank and stiring was carried out for 75 minutes at 100 rpm.

The product was a pourable and stable suspension containing 10% by weight boron as sodium pentaborate.

What is claimed is:

1. A pourable aqueous borate-conaing suspension composition comprising 8 to 13% by weight boron, 0.1 to 3% by weight swellable clay, and 0.05 to 0.2% by weight polysaccharide, said percentages based on the total weight of the suspension.

2. A suspension according to claim 1 which contains 9.5 to 12.5% by weight boron as sodium pentaborate.

3. A suspension according to claim 1 which contains 10 to 12% by weight boron as sodium pentaborate.

4. A suspension according to claim 1 wherein said swellable clay is in the range of about 0.5 to 1.5% by weight.

5. A suspension acording to claim 4 wherein said swellable clay is approximately 1% by weight.

6. A suspension according to claim 1 wherein said swellable clay is a montmorillonite clay, a mineral analogous to montmorillonite, or sepiolite.

7. A suspension according to claim 1 wherein the swellable clay is a sodium enriched montmorillonite clay, a sodium montmorillonite clay, hectorite, or sepiolite.

8. A suspension according to claim 1 wherein said swellable clay is selected from the group consisting of montmorilonite clay and swellable clays analogous thereto.

9. A suspension according to claim 1 wherein said swellable clay is bentonite.

10. A suspension according to claim 1 having a particle size of from about 0.1 to about 10 microns.

11. A suspension according to claim 1 wherein said polysaccharide is xanthan gum.

12. A suspension according to claim 1 which also contains a dispersant.

13. A suspension according to claim 12 wherein said dispersant is a polyacrylate.

14. A suspension according to claim 1 wherein said boron is in the range of about 10 to 12% by weight, said swellable clay is in the range of about 0.5 to 1.5% by weight, said polysaccharide is xanthan gum and said swellable clay is selected from the group consisting of sodium enriched montmorillonite clay, sodium montmorillonite clay, hectorite and sepiolite.

15. A suspension according to claim 14 which also contains a polyacrylate dispersant.

16. A suspension according claim 1 which also contains boric acid particles.

17. A method of treating crops which comprises applying the composition according to claim 1 to said crops.

18. The method according to claim 17 wherein said composition is diluted prior to application.

19. The method according to claim 17 wherein said composition is applied in the presence of another treatment agent.

20. A process for preparing a pourable aqueous suspension which comprises reacting boric acid and a sodium tetraborate in an aquous suspension under agitation to fotm a sodium pentaborate suspension comprising 8 to 13% by weight boron in the prescence of 0.1 to 3% by weight swellable clay and 0.05 to 0.2% by weight polysaccharide, said percentages based on the total weight of the suspension.

21. A process for preparing a pourable aqueous borate-containing suspension comprising the following steps:

(a) forming a mixture of swellable clay and polysaccharide with water;

(b) adding boric acid and a hydrated sodium tetraborate in substantially stoichiometric amounts for sodium pentaborate; and (c) allowing said boric acid and sodium tetraborate to react under agitated to form sodium pentaborate, thereby producing a pourable suspension comprising 8 to 13% by weight boron, 0.1 to 3% by weight swellable clay, and 0.05 to 0.2% by weight polysaccharide, said percentages based on the total weight of the suspension.

22. The process according to claim 21 wherein said mixture of clay and polysaccharide is heated to a temperature in the range of about 35 to 40° C.

23. A process according to claim 18 wherein the suspension contains about 10 to 12% by weight boron.

24. A process according to claim 18 wherein the suspension contains about 0.5 to 1.5% by weight swellable clay.

25. A process according to claim 18 wherein the swellable clay is sodium enriched montmorillonite clay, sodium montmorllonite clay, hectorite, or sepiolite.

26. A process according to claim 18 wherein the polysaccharide is xanthan gum.

27. A process according to claim 18 wherein the suspension contains about 10 to 12% by weight boron and about 0.5 to 1.5% by weight swellable clay, and wherein the polysaccharide is xanthan gum and the swelable clay is sodium enriched montmorillonite clay, sodium montmorillonite clay, hectorite, or sepiolite.

* * * * *